US008185143B1

(12) United States Patent
Othmer

(10) Patent No.: US 8,185,143 B1
(45) Date of Patent: May 22, 2012

(54) SELECTIVELY BUFFERING VOICE DATA AT A SERVER DURING A VOICE COMMUNICATION SESSION

(75) Inventor: Konstantin Othmer, Mountain View, CA (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 1334 days.

(21) Appl. No.: 11/781,806

(22) Filed: Jul. 23, 2007

Related U.S. Application Data

(62) Division of application No. 10/789,581, filed on Feb. 26, 2004, now Pat. No. 7,809,388.

(51) Int. Cl.
*H04B 7/00* (2006.01)
(52) U.S. Cl. .................. 455/518; 455/426.1; 455/553.1
(58) Field of Classification Search .......... 455/517–519, 455/426.1, 553.1
See application file for complete search history.

(56) References Cited

U.S. PATENT DOCUMENTS

| | | | |
|---|---|---|---|
| 5,781,613 A | 7/1998 | Knuth et al. | |
| 5,842,123 A | 11/1998 | Hamamoto et al. | |
| 5,867,793 A | 2/1999 | Davis | |
| 5,918,002 A * | 6/1999 | Klemets et al. | 714/18 |
| 5,995,824 A | 11/1999 | Whitfield | |
| 6,031,818 A * | 2/2000 | Lo et al. | 370/216 |
| 6,137,864 A | 10/2000 | Yaker | |
| 6,192,259 B1 | 2/2001 | Hayashi | |
| 6,222,909 B1 | 4/2001 | Qua et al. | |
| 6,363,258 B1 | 3/2002 | Schmidt et al. | |
| 6,366,771 B1 | 4/2002 | Angle et al. | |
| 6,370,375 B1 | 4/2002 | Shively | |
| 6,484,027 B1 | 11/2002 | Mauney et al. | |
| 6,574,418 B1 | 6/2003 | Akiba et al. | |
| 6,665,283 B2 | 12/2003 | Harris et al. | |
| 6,671,353 B1 | 12/2003 | Goh | |
| 6,751,747 B2 * | 6/2004 | Li | 714/4.1 |
| 6,754,224 B1 * | 6/2004 | Murphy | 370/432 |
| 6,826,154 B2 | 11/2004 | Subbiah et al. | |
| 6,885,987 B2 | 4/2005 | Buchholz et al. | |
| 6,930,994 B1 | 8/2005 | Stubbs | |
| 6,959,075 B2 | 10/2005 | Cutaia et al. | |
| 7,043,266 B2 | 5/2006 | Chaturvedi et al. | |
| 7,054,420 B2 * | 5/2006 | Barker et al. | 379/88.25 |
| 7,277,423 B1 | 10/2007 | Welch | |
| 7,277,720 B2 | 10/2007 | Lazaridis | |

(Continued)

OTHER PUBLICATIONS

U.S. Appl. No. 10/789,581, filed Feb. 26, 2004, Inventor: Konstantin Othmer, Title: Selectively replaying voice data during a voice communication session.

(Continued)

*Primary Examiner* — Simon Sing
(74) *Attorney, Agent, or Firm* — Workman Nydegger

(57) ABSTRACT

Systems and methods for selectively replaying voice data. Voice data received in a communication session is both buffered by a server such that the buffered data can be played by a recipient device. When input is received from a recipient, the voice data currently being received is no longer played and buffered voice data is replayed to the recipient. While the buffered voice data is replayed, the server continues to buffer any voice data ensure that the recipient device can play all of the voice data in the communication session. By only storing voice data in the buffer, replaying the buffered voice data can catch the real-time voice data. At this point, the recipient device reverts to playing voice data being received while the server continues to buffer the voice data.

18 Claims, 2 Drawing Sheets

U.S. PATENT DOCUMENTS

| | | |
|---|---|---|
| 7,809,388 B1 | 10/2010 | Othmer |
| 7,881,326 B2 * | 2/2011 | Siminoff ................ 370/431 |
| 2002/0080925 A1 | 6/2002 | Tokunaga |
| 2002/0176546 A1 | 11/2002 | Dietz et al. |
| 2003/0153343 A1 | 8/2003 | Crockett et al. |
| 2003/0154243 A1 | 8/2003 | Crockett et al. |
| 2003/0165135 A1 * | 9/2003 | Itzkovitz et al. ............ 370/352 |
| 2003/0235184 A1 | 12/2003 | Dorenbosch et al. |
| 2004/0224678 A1 | 11/2004 | Dahod et al. |
| 2005/0164681 A1 | 7/2005 | Jenkins et al. |
| 2008/0026701 A1 | 1/2008 | Lazaridis |

OTHER PUBLICATIONS

U.S. Appl. No. 10/789,581, filed Feb. 26, 2004, Konstantin Othmer.
U.S. Appl. No. 11/781,810, filed Jul. 23, 2007, Konstantin Othmer.
U.S. Appl. No. 10/672,579, filed Sep. 25, 2003, Douglas R. van Kirk.
U.S. Appl. No. 12/880,603, filed Sep. 13, 2010, Konstantin Othmer.

* cited by examiner

SELECTIVELY BUFFERING VOICE DATA AT A SERVER DURING A VOICE COMMUNICATION SESSION

RELATED APPLICATIONS

This patent application is a divisional of U.S. patent application Ser. No. 10/789,581, filed Feb. 26, 2004, which is incorporated herein by reference.

BACKGROUND OF THE INVENTION

1. The Field of the Invention

The invention relates to selectively replaying voice data during a communication session. In particular, embodiments of the invention are directed to selectively replaying voice data during network-based instant connect communication (also known as Push to Talk®) and during conventional telephone communication.

2. The Relevant Technology

Mobile telephones are some of the most common communication devices in use today. As the popularity of mobile telephones and other telephony-enabled wireless devices such as personal digital assistants increases, the ways in which these devices are used also grows. One application of mobile telephone technology is to use mobile telephones as if they were two-way radio devices or "walkie-talkies." The ability to use mobile telephones as walkie-talkies is often referred to as "push-to-talk". Communication in a push-to-talk system can be one-to-one or one-to-many. One example of a push-to-talk system is Nextel's iDEN-based Push to Talk® (also known as Direct Connect™) service.

Push-to-talk systems may be implemented using standard Voice Over Internet Protocol (VoIP) technologies or other technologies, where voice data is sent in digital form over data networks. Such push-to-talk systems are hereinafter referred to as "network-based instant connect systems", and they can be deployed in various networks, including circuit-switched networks and packet data networks, and may use any combination of wireless and wireline devices.

Network-based instant connect communication allows a sender to speak to a recipient without the customary procedure of dialing a telephone number and waiting for the recipient to answer. Network-based instant connect communication services combine the convenience of near-instantaneous connection between users with the range and security afforded by a network. Once an instant connect session is established over the network, the voice data transmitted from a sender is played on the recipient's device without any action on the part of the recipient. This is in contrast to a regular telephone call where the recipient is required to manually respond to a ringing telephone.

Because network-based instant connect calls are designed to mimic walkie-talkie communication, the communication channel is used in a half-duplex manner, meaning that voice data can only flow in one direction at a time. The ability to transmit voice data is often referred to as "having the floor". In a network-based instant connect communication, the sender typically sends a floor request signal to a server in the network by pressing the talk button on a suitably enabled wireless device. Once the floor is granted, the sender may speak to the recipient until the talk button is released. The recipient of the voice data who does not have the floor can merely receive the voice data and cannot take the floor until the sender relinquishes the floor.

As noted above, one general feature of network-based instant connect communications is that, if the recipient's device is powered on and is in a mode to accept incoming calls, any incoming network-based instant connect calls result in the recipient's device automatically outputting voice data. The recipient of an instant connect call does not typically control when the instant connect call is received and there may be situations when the recipient does not understand or cannot clearly hear what the sender said.

The inability to understand a sender in an instant connect call can occur, for example, when the recipient is in a noisy environment. Construction sites, restaurants, and traffic are examples of environments where a recipient of an instant connect call may be unable to understand the sender. The inability to understand a sender can also occur when the voice data is incomplete. During instant connect communication, voice data is often sent over an IP network using a connectionless protocol that does not guarantee delivery of the packets that are sent. The recipient's device plays the packets that are received, but when packets are dropped the played voice data may be very difficult to understand, and depending on how many packets are dropped, may include periods of silence when the speaker cannot be heard at all. When voice data is not understood, the recipient may have to wait to obtain the floor and then request that the sender repeat himself or herself.

Additionally, a recipient who is in a noisy environment or who is preoccupied with another activity may not hear an incoming network-based instant connect call at all and may never know that a sender attempted to reach him or her. Missing an instant connect call altogether could have negative consequences for both personal and business related matters.

The problem of packet loss during voice communication is not exclusive to half-duplex communication; indeed, the problem applies to full-duplex voice sessions in which voice data can be carried both directions simultaneously on a single channel, such as a wireless or wireline telephone call. During a full-duplex call occurring over an IP network, packet loss may occur resulting in the same poor user experience previously described. In this situation, while it is easier for a recipient to ask the speaker to repeat him or herself, there are situations where it may disrupt communication or be otherwise undesirable to do so.

SUMMARY OF THE INVENTION

These and other limitations of conventional voice communication are overcome by embodiments of the invention, which are directed to buffering voice data and selectively replaying the buffered voice data during or after voice communication sessions. While the invention is particularly useful in conjunction with network-based instant connect calls, the invention is not limited to this communication mode and may be applied to other voice communication modes such as conventional, full-duplex voice communication and to voice communication using devices that operate using radio frequency (RF) communication techniques.

In the exemplary embodiment, wherein the sender and one or more recipients are engaged in a network-based instant connect call, voice data received by a recipient's device is both played by the recipient's device and buffered by the device in a voice data buffer. When the recipient depresses a replay button, the device stops playing the voice data being received and begins playing voice data from the buffer. As voice data is being played from the buffer, the device continues to buffer any additional voice data that may be received by the device. This ensures that the recipient is able to listen to all of the voice data that is received by the device even though the voice data is being selectively replayed.

As the voice data is buffered, silences between senders are not buffered. In addition, voice data of the recipient is not buffered. This permits the voice data of the sender(s) to be stored sequentially in the buffer and the buffered voice data can therefore be replayed faster than it occurred in "real-time." It should be noted that references to "real-time" voice data refer to voice data that is being received by the device during the communication session, and which is then buffered. The use of the term "real-time" voice data is for convenience only and should not be construed to limit the scope of the invention. For the purposes herein, "real-time" voice data may be played on the device after some type of delay due to network conditions or other conditions. As a result, replaying the buffered voice data will catch up with the real-time or near real-time voice data being received by the device. At this point, the device typically reverts to playing the voice data being received while buffering the voice data at the same time.

The buffer can be accessed, for example, in time increments or in sender increments. In time increments, the buffer is accessed at time periods or intervals that are pre-determined. The recipient can access the buffer in successive increments in this manner. Another method of navigating forward in time can be provided in some embodiments. This may consist of a second button that skips ahead one phrase (to the next silence, to the first unheard audio, or to real-time). Skipping to real-time can also occur if the listener begins to talk, or requests the floor. When the buffer is accessed in sender increments, the buffer is accessed at locations where a particular statement of a sender begins. One of skill in the art can appreciate that the location where the buffer is accessed and replayed can be configured in a variety of different ways.

In another embodiment, the device improves a quality of the buffered voice data by replacing missing or dropped packets. Voice data received by a device may be missing packets, for example. These missing packets can be requested and when all or some of the packets are received, they are inserted into the appropriate places in the buffered voice data. Thus, the buffered voice data is more complete and can be more easily understood by a recipient.

In another embodiment, the buffered voice data may be saved to local memory on the device for access at a later time. In the case where the recipient is not aware that an instant connect call is incoming, the device can be configured to save a specified amount of the buffered voice data. For example, if the recipient does not use the talk or replay button within a preset amount of time, the device can interpret this to mean that the recipient is otherwise occupied and is unable to access the incoming voice data and the buffered voice data at the present time. Once this determination has been made, the device can redirect the buffered voice data to longer term memory on the device where it can be accessed when the recipient again becomes available. In this manner, the recipient can know that a sender has attempted to reach him or her, and the recipient can listen to the sender's saved voice data to hear the nature of the instant connect call.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which.

DETAILED DESCRIPTION OF THE PREFERRED EMBODIMENTS

Network-based instant connect communication enables users to communicate using wireless or wireline networks in ways that mimic and exhibit many of the advantageous features of walkie-talkie communication. Network-based instant connect communications or calls can be one-to-one calls or one-to-many calls. To place an instant connect call, a sender typically identifies a recipient or a group of recipients on the contact list resident on the sender's wireless device. The sender next pushes a talk button or otherwise causes the wireless device to initiate an instant connect call to the recipient. Conventional instant connect calls are conducted in such a way that once the session is established, the recipient's device decodes and reproduces the sender's voice data.

Embodiments of the invention relate to systems and methods for selectively replaying the received voice data. Advantageously, a recipient device replays voice data without missing new voice data that may be subsequently sent to the recipient's device. In other words, while previously received voice data is being replayed, new voice data is stored so that the recipient is assured of being able to listen to the new voice data. In addition, the voice data can be replayed in a manner that enables the recipient to catch-up with an ongoing instant connect communication. In one embodiment, a recipient is able to review or replay statements made by a sender without having to go through the process of obtaining the floor and requesting that the sender repeat himself or herself.

Embodiments of the invention also improve the quality of the voice data being replayed by the recipient's device. For example, the receiving server acknowledges the data packets in a voice stream. If packets are missing, the server can resend them, either in response to a request or automatically. The voice data being received is still played, but if the buffer is accessed and the voice stream listened to again, the quality may be significantly improved. Similarly, this process can occur over a peer-to-peer connection. For example, there may be a direct, peer-to-peer connection between two or more wireless devices. A receiving wireless device may request missing packets from a sending device; in this case a server is not participating in the process. In yet another embodiment, the recipient's device may determine that the recipient is unavailable for an instant connect call, and the buffered voice data is then automatically transferred to longer term memory on the device for access at a later time.

1. Instant Connect Communication Networks

Figure 1:
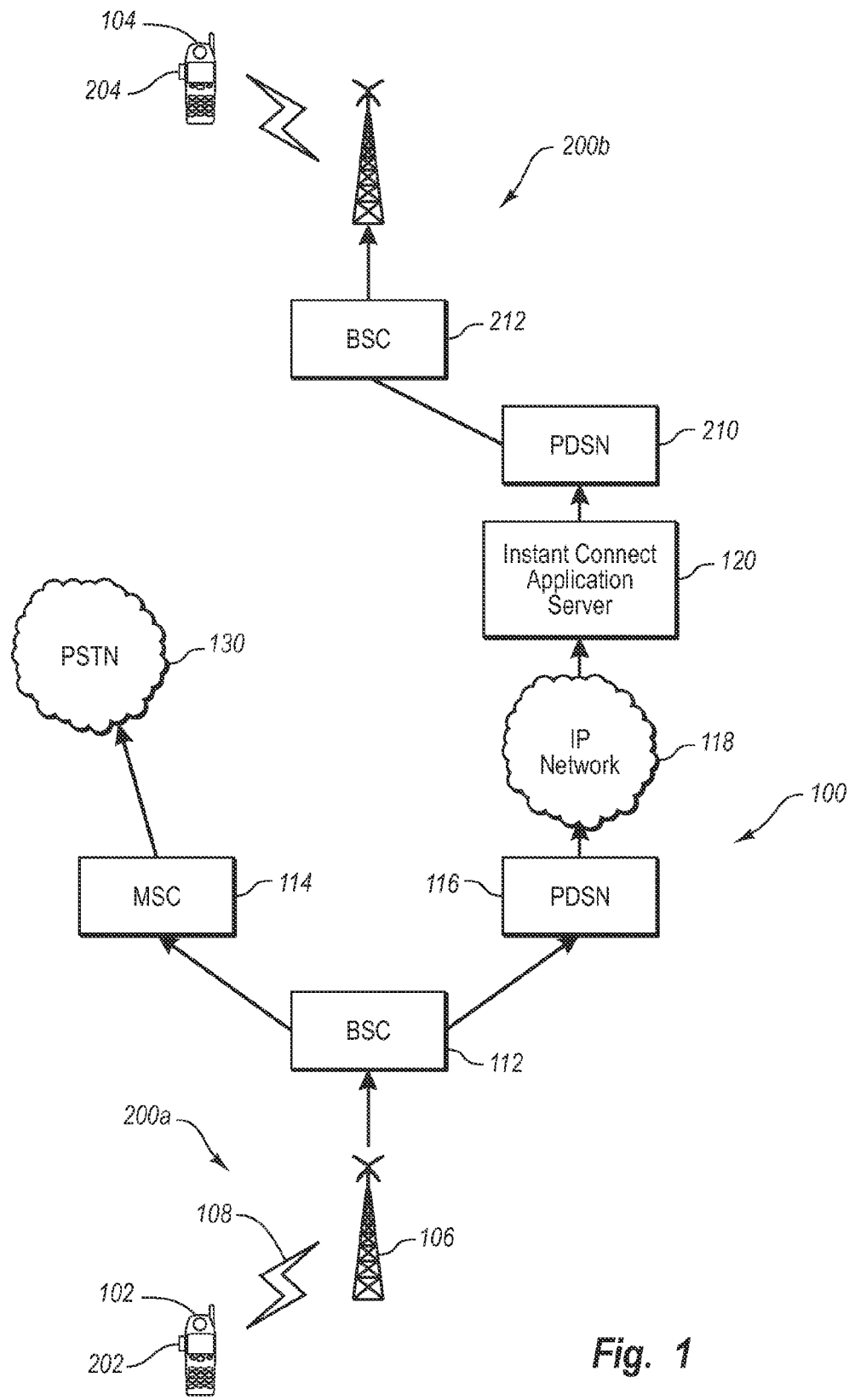
FIG. 1 is a block diagram illustrating a wireless network in which the network-based instant connect communication systems of the invention may be practiced.

In order to describe the various methods of the invention, FIG. 1 illustrates an example of network 100 in which the invention can be practiced. It is to be understood that the network of FIG. 1 represents only an example of the suitable environments in which embodiments of the invention can be implemented, and that other network architectures, including wireline networks or combinations of wireless and wireline networks, are possible. Network 100 includes one or more wireless telephone networks that operate with network-based instant connect devices 102 and 104. In the illustrated example, device 102 operates within cellular network 200a, while device 104 operates within cellular network 200b.

FIG. 1 illustrates base station 106 in cellular network 200a that communicates with network-based instant connect device 102 by transmitting and receiving radio signals 108. Base stations 106 and other base stations in network 200a operate over respective regions or cells within which the radio signals 108 are sufficiently strong to provide reliable communication. In cellular networks, a grid of partially overlapping cells is positioned in a geographic area to provide service for the network-based instant connect devices anywhere in the range of the cells. Base station 106 may operate under the control of associated base station controllers 112, which may in turn be coupled with a packet data serving node (PDSN) 116. Base station 106 may also be coupled with a mobile switching center 114, which enables device 102 to communicate with the public switched telephone network (PSTN) 130.

In network 100 of FIG. 1, network-based instant connect device 102 may acquire radio connectivity and IP network connectivity in a manner well known in the art. For example, device 102 may issue an origination request to mobile switching center 114, which may send the request back to BSC 112. BSC 112 may assign a traffic channel to device 102, or it might forward the request to PDSN 116, which works with device 102 to establish a data link by which voice and data is transmitted to and received from the device. Device 102 may then initiate and participate in network-based instant connect communication sessions with the assistance of a PDSN 116, which provides device 102 with a gateway to IP network 118. The voice data from device 102 is then delivered to a network-based instant connect application server 120, which among other functionality, may be responsible for arbitrating and managing floor control allocation or voice data transmission.

Alternatively, rather than floor control being arbitrated by a network element such as an instant connect application server, the logic to implement floor control allocation may be resident on the network-based instant connect device, in which case the participating devices decide who controls the floor. In FIG. 1, since the other network-based instant connect device 104 is located within the range of a cellular network 200b, the base station controller 212 and associated PDSN 210 are used to establish the communication between the devices 102 and 104. Network-based instant connect device 104 acquires radio connectivity and IP network connectivity with the assistance of the associated BSC 212 and PDSN 210 as described previously. In this way, the network-based instant connect devices 102 and 104 can communicate with substantially any other compatible network-based instant connect devices that are located in the interoperating cellular networks, such as networks 200a, 200b, etc.

It should be understood that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

Network-based instant connect calls in network 100 are designed to give the calling parties an experience similar to those that are associated with the use of a conventional or personal walkie-talkie. Network-based instant connect devices 102 and 104 have "talk buttons" 202 and 204, respectively. The talk buttons are used to initiate the transmission of voice data from the corresponding network-based instant connect devices. In general, network-based instant connect calls are initiated when the user selects a recipient from the contact list on a wireless device and presses the talk button. Conventional network-based instant connect calls are received as the receiving device is automatically activated and caused to decode and reproduce the incoming voice data without requiring the recipient to expressly accept the call by manually responding to a ring or other indicator of an incoming call.

Although the cellular networks 200a and 200b on which network-based instant connect calls are carried inherently have full-duplex capabilities, network-based instant connect calls are transmitted using half-duplex communication so as to mimic the walkie-talkie experience. The use of half-duplex communication means that data can travel in only one direction at any given time. In order to indicate to the system in which direction voice data should be sent, network-based instant connect devices 102 and 104 may utilize a talk button or other user input mechanism which causes a floor request signal to be generated. The device that has the floor has the ability to transmit voice data, whereas the device that does not have the floor can only receive the data. The invention, however, can be practiced in conjunction with methods that enable the party without the floor to reassign the floor and initiate the transmission of voice data without waiting for the remote party to relinquish the floor.

These methods can be performed in existing cellular networks (e.g., networks 200a and 200b) that have network-based instant connect capabilities as well as with existing network-based instant connect devices that have been adapted to perform the acts disclosed herein. Examples of such methods are disclosed in U.S. patent application Ser. No. 10/652,867, filed Aug. 29, 2003, entitled "Floor Control Management in Network-Based Instant Connect Communication," which is incorporated herein by reference.

2. Selectively Replaying Voice Data in an Instant Connect Call

Figure 2:
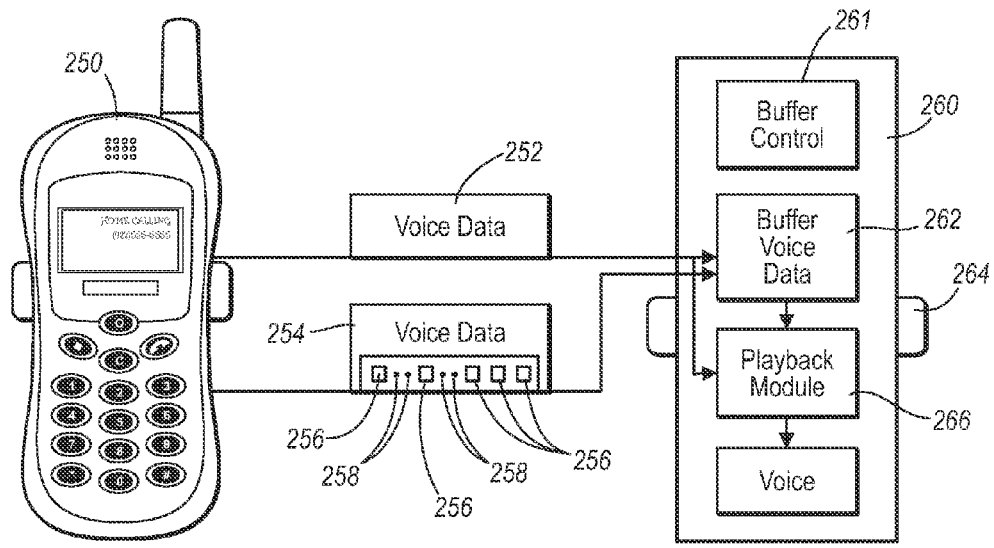
FIG. 2 illustrates one embodiment of a device that both buffers voice data and plays voice data such that the buffered voice data can be played back by the recipient.

FIG. 2 illustrates wireless devices that selectively replay voice data. The device 250, in this example, is a sender device that initiates an instant connect call with the device 260. The device 250 transmits voice data 252 to the device 260. During normal operation of the instant connect call, the voice data 252 is received by the device 260 and the playback module 266 performs the necessary operations to immediately play the voice data 252 to the recipient. The devices 250, 260 can selectively replay voice data while engaged in an instant connect call. One advantage of selectively replaying voice data is that the device 260 does not have to obtain the floor from the device 250 in order to request that the sender repeat himself or herself.

In this embodiment, the voice data 252 is also buffered in a voice data buffer 262. The voice data 252 is thus being played by the playback module 266 and buffered in the voice data buffer 262 simultaneously. The voice data buffer 262 is typically embodied as a temporary buffer and may only store a limited amount of voice data. For example, the voice data buffer 262 may be configured to store 15 seconds of voice data. Once the voice data buffer is full, the oldest voice data is replaced with the newest voice data. One of skill in the art can appreciate that the size of the voice data buffer can vary considerably and that the size of the voice data buffer determines how much voice data can be buffered. In some embodiments, a recipient may be able to permanently store a portion of the voice data buffer. However, the voice data buffer is typically used as a temporary storage that enables a recipient of voice data to listen to the recent statements of the senders in the instant connect call. Thus, the voice data buffer may be cleared when an instant connect call terminates or within a predetermined time after the instant connect call ends.

The device 260 includes a replay button 264 that can be used to selectively play voice data from the voice data buffer 262. The replay button 264 can be implemented in a variety of different ways. The replay button 264, for example, may be an independent button on the device 260 or may share functionality with another button on the device 260. Thus, the recipient can invoke different functions depending on how the replay button 264 is configured or pressed.

When the recipient depresses the replay button, the playback module 266 stops playing the voice data 252 being received. The playback module 266 accesses the voice data buffer 262 and replays the buffered voice data. While the buffered voice data is being played, the device 260 continues to buffer additional voice data 252 that is being received such that the recipient does not miss any portion of the incoming voice data. Advantageously, the recipient does not have to wait for the sender to relinquish the floor or interrupt the sender to ask the sender to repeat his or her statement. In addition, because incoming voice data is being continuously buffered, even while a replay activity is occurring, the recipient is able to listen to all of the sender's voice data.

When the playback module 266 begins playing voice data from the voice data buffer 262, the voice data buffer 262 can be accessed in different ways. For example, the voice data buffer 262 may be accessed at the point that corresponds to the oldest voice data. This enables the recipient to replay all of the buffered voice data. Alternatively, the recipient may desire to access the voice data in time increments or intervals. After the replay button has been depressed, the playback module begins playing voice data that is, for instance, five seconds old. By pressing the replay button a second time or by any other input, the playback module may access the voice data an additional 5 seconds into the past. While in a replay mode, the replay button 264 or another key on the device 260 may be configured to back up additional intervals into the buffered voice data. Each time the relevant key is pressed in the replay mode, older voice data is accessed. The size of the voice data buffer 262 may limit how far back into a call a recipient can go, however. In another embodiment, the voice data buffer can be accessed by statement or by sender. This may ensure that the replayed voice data occurs from the beginning of a particular sender's voice data. In this example, each statement typically corresponds to the voice data transmitted by a sender while that sender has the floor of the instant connect call.

As previously stated, the voice data 252 is continually being buffered by the device 260. This ensures that the recipient is able to listen to the entire instant connect call even when in replay mode. In some embodiments, the voice data buffer can be increased dynamically to account for instances when the recipient repeatedly depresses the replay button. Alternatively, the voice data that can be replayed at a given instant in time decreases because newer voice data may be replacing the older voice data in the voice data buffer.

The embodiment illustrated in FIG. 2 also has the ability to improve the buffered voice data as illustrated by the voice data 254. Often, voice data is transmitted over an IP network using User Datagram Protocol (UDP). UDP is a connectionless protocol that provides little error recovery. Packets are simply sent over the network with no guarantee that they will arrive at the destination. In this embodiment, the voice data 254 includes packets 256 and 258. In particular, the packets 256 represent packets of the voice data 254 that arrive at the device 260 and the packets 258 represent dropped or lost packets from the voice data 254.

As previously stated, the playback module 266 decodes and plays the packets that it receives as soon as they are received. From the recipient's perspective, the voice data 254 may be difficult to understand because of the dropped packets 258. In this embodiment, however, the voice data 254 is also buffered in the voice data buffer 262. Initially, the voice data 254 stored in the voice data buffer 262 is missing the same dropped packets 258. The buffer control 261 may recognize that packets have been dropped or are missing from the voice data 254 and thus request that a network server such as the instant connect application server or the PDSN, a sending wireless device, or another suitable source resend either the complete voice data 254 and/or the dropped packets 258. The resent data packets of voice data 254 and/or dropped packets 258 have a sequence number and when they are resent to the device 260, the buffer control 261 can ensure that they are placed in the voice data buffer 262 in the appropriate location. In this manner, the buffer control 261 can improve the quality of the buffered voice data in this embodiment.

Thus, when the recipient first hears the voice data 254, the recipient may not be able to understand the voice data 254 because of the lost or dropped packets 258 and the voice data may be unintelligible. When the recipient depresses the replay button 264, the buffer control 261 may have had time to request the dropped packets and include the dropped packets in the voice data buffer 262. As a result, the quality of the buffered voice data may be better than the voice data that was originally played to the recipient. If the buffer control 261 does not have time to replace the dropped packets, then buffered voice is replayed to the recipient as it was originally buffered. The buffer control 261 can continue to request missing packets even when the device 260 is in a replay mode. In addition to the methods for buffering the voice data locally and requesting the missing packets, the invention also extends to methods performed at a network server or an application server to buffer the packets and to respond to requests for the missing packets.

In one embodiment, the device 260 can delay replaying the buffered voice data until sufficient packets are received. In this case, however, new voice data is still being buffered to ensure that the recipient is able to listen to all of the voice data. Often, the device 260 can take advantage of silences in the instant connect call to improve the quality of the buffered voice data.

Figure 3:
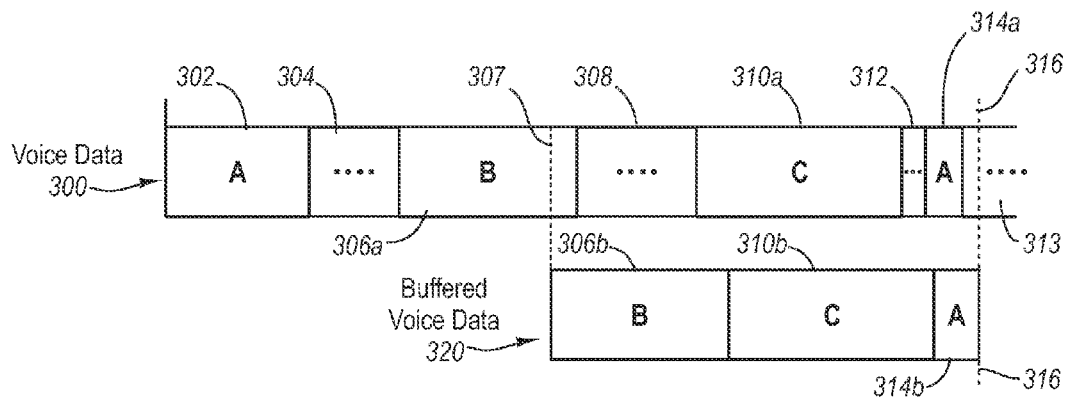
FIG. 3 illustrates an embodiment where the buffered voice data is played back during an instant connect call in a manner that prevents the user from missing any voice data.

FIG. 3 illustrates a timeline of voice data and buffered voice data from a perspective of a recipient's device. FIG. 3 illustrates an example where a recipient is receiving voice data from three different senders: A, B, and C. The voice data 300 is received at the device as follows. Voice data 302 from sender A is received at the device of the recipient and is followed by a silence 304. Voice data 306a from sender B is then received and is followed by a silence 308. The silence 308 is followed by voice data 310a from sender C, a silence 312, voice data 314a from sender A and a silence 313. The voice data 300 thus illustrates a typical instant connect call that plays voice data that is received from one or more senders. The voice data 300 is buffered as previously described.

When the replay button is depressed or otherwise activated, the voice data buffer is accessed at a predetermined point. In this example, the buffered voice data 320 represents the voice data that is played from the recipient's device when the replay button is depressed. At instant 307 in the voice data 300 of the instant connect call, the recipient depresses or activates the replay button. The buffered voice data is accessed and played from the beginning of the voice data of sender B. In this example, the buffered voice data begins playing from the beginning of the voice data 306a from sender B. More specifically, the buffered voice data 306b is being replayed to the recipient. Next, the buffered voice data 310b from the sender C is played and is followed by the buffered voice data 314b from the sender A.

In this example, the buffered voice data 320 does not include the silences that typically occur in a normal instant connect call. In other words, the silences that occur between senders in an instant connect call are not typically buffered. The recipient's device or buffer control can recognize when voice data is present and when it is not present. The instant connect call is effectively time compressed by eliminating the silences. This enables the recipient's device to play the buffered voice data call faster than the instant connect call occurred in real-time. In this example, at instant 316, the buffered voice data 320 has caught up to the real-time voice data during the silence 313. Because the replay of the buffered voice data has caught up to the new voice data being received, the recipient's device can revert back to playing the voice data being received at the recipient's device. The recipient's device continues to buffer the voice data as described above.

The recipient has a choice of whether the recipient wants to hear the entire conversation, or just what others have said. In a preferred embodiment, the recipient's voice is not played, thus further accelerating the replay timeline.

Figure 4:
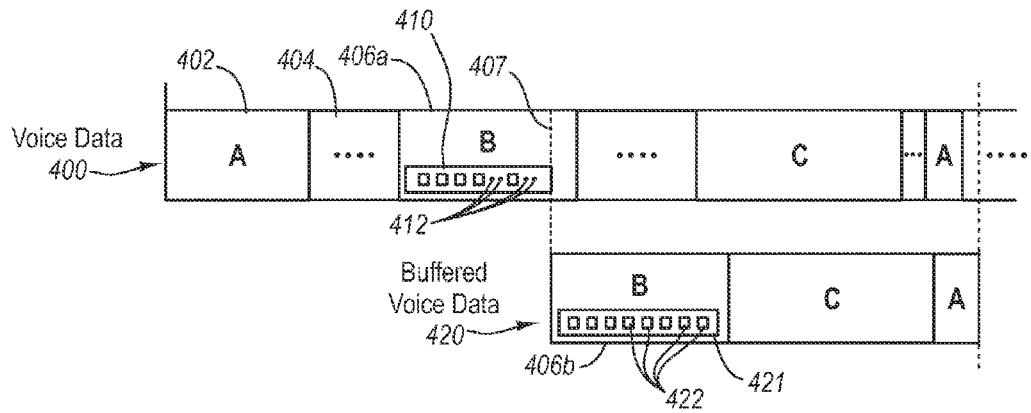
FIG. 4 illustrates an embodiment where the quality of the buffered voice data is improved before or during playback of the buffered voice data.

FIG. 4 illustrates an embodiment where the buffered voice data is improved by replacing dropped or missing packets. The voice data 406a from sender B includes packets 410 that are delivered over an IP network. As previously stated, voice data packets may be dropped during transmission and the voice data received by a device may not include all of the packets that were sent. This situation is illustrated in FIG. 4 by the dropped packets 412.

The device of the recipient can recognize when voice data is incomplete. The device can then request of a network server or a peer device that the dropped packets be resent or that the entire segment of voice data be resent. The packets received in response to this request from the client are inserted in the buffered voice data at appropriate locations. Thus, the buffered voice data 406b from sender B typically includes at least some of the packets 422 that were dropped in the original transmission of voice data as illustrated by the dropped packets 412.

When the recipient depresses the replay button at instant 407, the buffered voice data 406b that is played from the voice data buffer of the recipient's device is more clear due to the packets that have been added or replaced. The recipient's device can request the dropped packets as the voice data is buffered, when the user depresses the replay button, or any other suitable time.

As voice data is replayed from the voice data buffer, the recipient also has various options. The recipient, for example, can cause the buffered voice data to be replayed at a faster rate. While removing the silences that typically occur in instant connect calls from the buffered voice data ensures that the recipient will catch up to real-time, replaying the buffered voice data at a faster rate enables the recipient to catch the real-time instant connect call more quickly. Additionally, the recipient may also have the ability to simply skip back to the real-time voice data.

In one embodiment, the status of the selectively replayed voice data is displayed to the recipient via the display of the device. For instance, the display may indicate that buffered voice data is being played, identify the sender corresponding to the buffered voice data being played, indicate a rate at which the buffered voice data is being played, display when the replay of the buffered voice data will catch the real-time or near real-time voice data being buffered, and the like or any combination thereof.

The display may also indicate buttons that may be used to alter how the buffered voice data is replayed. For instance, one button may change the rate at which the buffered voice data is replayed. Another button may enable the recipient to skip to the next sender or statement in the buffered voice data. The display can also identify which sender is associated with the voice data being replayed and update this information as the sender changes.

Other buttons or soft keys on the recipient's device can be used for other functions related to the buffered voice data. A first button or a button tap, for example, may skip ahead one phrase to the next silence, stop the playback of the buffered voice data, erase the voice data buffer, jump to real-time and the like. Alternatively, jumping to real-time can occur if the listener begins to talk, or requests the floor. A second button may save the buffered voice data as a voice message on the device for future playback. In this case, the buffered voice data that is converted to a voice message is stored in permanent memory of the device instead of the voice data buffer. This enables the recipient to store, for instance, an important part of an instant connect call. The voice message may be represented in and accessed from a message Inbox on the wireless device.

In addition, an incoming network-based instant connect call can be automatically saved to a local memory on the recipient device if the recipient fails to respond to or participate in the incoming call. As noted above, if the recipient fails to actively participate in the instant connect call by, for example, failing to depress the talk or replay buttons, at least a portion of the buffered voice data is transferred to a more permanent local memory for storage. The stored portion of the voice data can be later accessed by the recipient so that the recipient can learn the nature of the missed instant connect call. Details of suitable methods of buffering voice data of a network-based instant connect call are found in U.S. patent application Ser. No. 10/672,579, filed Sep. 25, 2003, which is incorporated herein by reference. The methods of the foregoing application can be used in connection with the buffering methods disclosed herein to store voice data associated with a missed network-based instant connect call.

For illustrative purposes, the foregoing embodiments use the methods disclosed herein in conjunction with network-based instant connect communication. However, the scope of the invention is not so limited. Other embodiments provide for buffering voice data and selectively replaying voice data during conventional, full-duplex wireline and wireless telephone calls. For example, the base and handset of a recipient's cordless telephone may be suitably equipped to begin buffering voice data when a telephone call is received. As previously described, the recipient may become subject to unanticipated environmental noise or may be otherwise unable to properly hear the speaker. By using one or more keys on the telephone handset, the recipient may replay the buffered voice data rather than asking the speaker to repeat himself. The base of the telephone may be equipped with longer term memory in order to store buffered voice data for later access. Similarly, the methods of the invention may be applied to a recipient's mobile telephone or other telephony-enabled wireless device to buffer the voice data of a conventional, full-duplex, wireless voice communication.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a server that operates in a communication network in which communication sessions are established between devices, a method for buffering voice data such that the voice data can be selectively replayed on a device, the method comprising:

during a communication session of a connectionless protocol, simultaneously transmitting packets of voice data via the communications network from a sender device to a recipient device and buffering the packets of the voice data at the server such that the buffered packets can be resent upon receipt of an appropriate request;

receiving a request for missing packets from the recipient device, the request having been sent from the recipient device in response to the recipient device determining that at least some of the packets are missing and receiving input from a recipient requesting the voice data to be replayed at the recipient device; and in response to the request for the missing packets, sending the missing packets to the recipient device such that the recipient device can:

combine the missing packets with already received packets and replay the voice data including both the missing packets and the already received packets;

replay the voice data associated with the missing packets until the voice data associated with the missing packets catches up to voice data being received at the device in real time; and resuming playing the voice data being received at the device.

2. A method as defined in claim 1, wherein the server comprises one of a network server and an application server.

3. A method as defined in claim 1, wherein the recipient device replays the voice data by accessing packets from a local buffer and adding thereto the missing packets received from the server.

4. A method as defined in claim 1, wherein buffering the packets of the voice data comprises:

buffering packets of voice data of a first sender in the buffer; and buffering packets of voice data of one or more subsequent senders in the buffer, wherein a silence between the first sender and the one or more subsequent senders is not stored in the buffer.

5. A method as defined in claim 1, further comprising accessing the buffer based on a pre-determined time period in response to receiving a request, such that the missing packets can then be sent to the recipient device.

6. A method as defined in claim 1, further comprising accessing the buffer based on a particular sender in response to receiving a request, such that the missing packets can then be sent to the recipient device.

7. A method as defined in claim 1, wherein sending the missing packets to the recipient device such that the recipient device can replay the voice data is performed such that the recipient device can replay a portion of the voice data from a point in the buffer that corresponds to a beginning of a voice data segment of a particular sender.

8. A method as defined in claim 1, wherein sending the missing packets to the recipient device such that the recipient device can replay the voice data is performed such that the recipient device can replay a portion of the voice data from a point in the buffer that corresponds to a time period.

9. A method as defined in claim 1, wherein sending the missing packets to the recipient device such that the recipient device can replay the voice data is performed such that the recipient device can:

stop the voice data in the buffer from being played; and resume playing voice data being received at the recipient device.

10. A method as defined in claim 1, wherein sending the missing packets to the recipient device such that the recipient device can replay the voice data is performed such that the recipient device can access the voice data in the buffer at a different location to replay another selected portion of the buffered voice data.

11. A method as defined in claim 10, further comprising continuing to buffer voice data that is received at the server while receiving input from the recipient device.

12. A method as defined in claim 1, further comprising deleting the voice data in the buffer when the communication session terminates.

13. A method as defined in claim 1, further comprising deleting the voice data in the buffer a pre-determined period of time after the communication session terminates.

14. A method as defined in claim 1, wherein at least one device participating in the communication session is associated with a circuit-switched network.

15. A method as defined in claim 1, wherein at least one device participating in the communication session is associated with a packet data network.

16. A method as defined in claim 1, wherein at least one device participating in the communication session is associated with RF communication techniques.

17. A method as defined in claim 1, wherein the communication session is associated with a network-based instant connect call established over a packet data network.

18. A method as defined in claim 1, wherein:

the network-based instant connect call has been missed by the recipient device when the network-based instant connect call was initially transmitted; and sending the missing packets to the recipient device is performed such that the recipient device can access the missed network-based instant connect call.

* * * * *